United States Patent Office 3,500,826
Patented Mar. 17, 1970

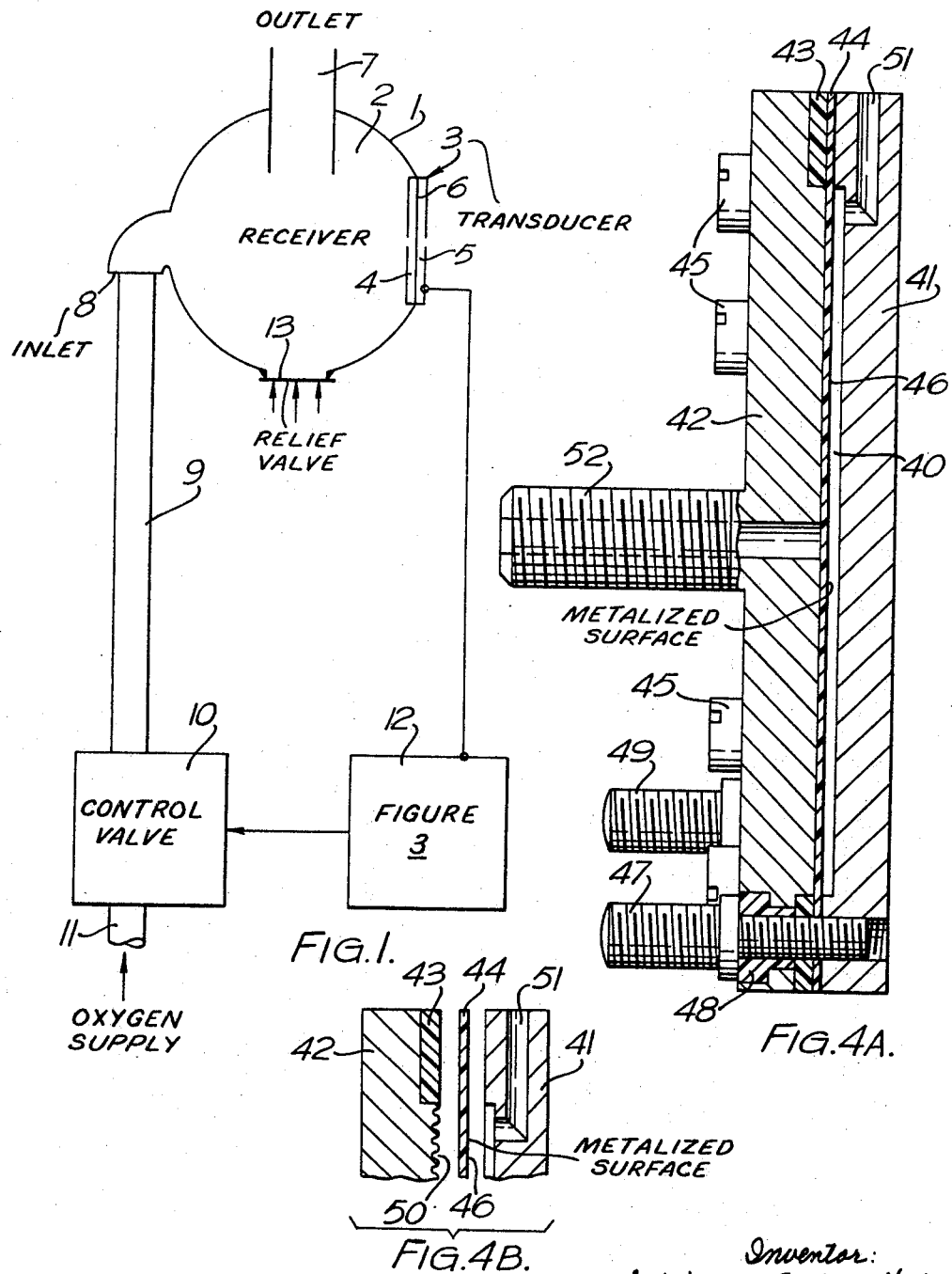

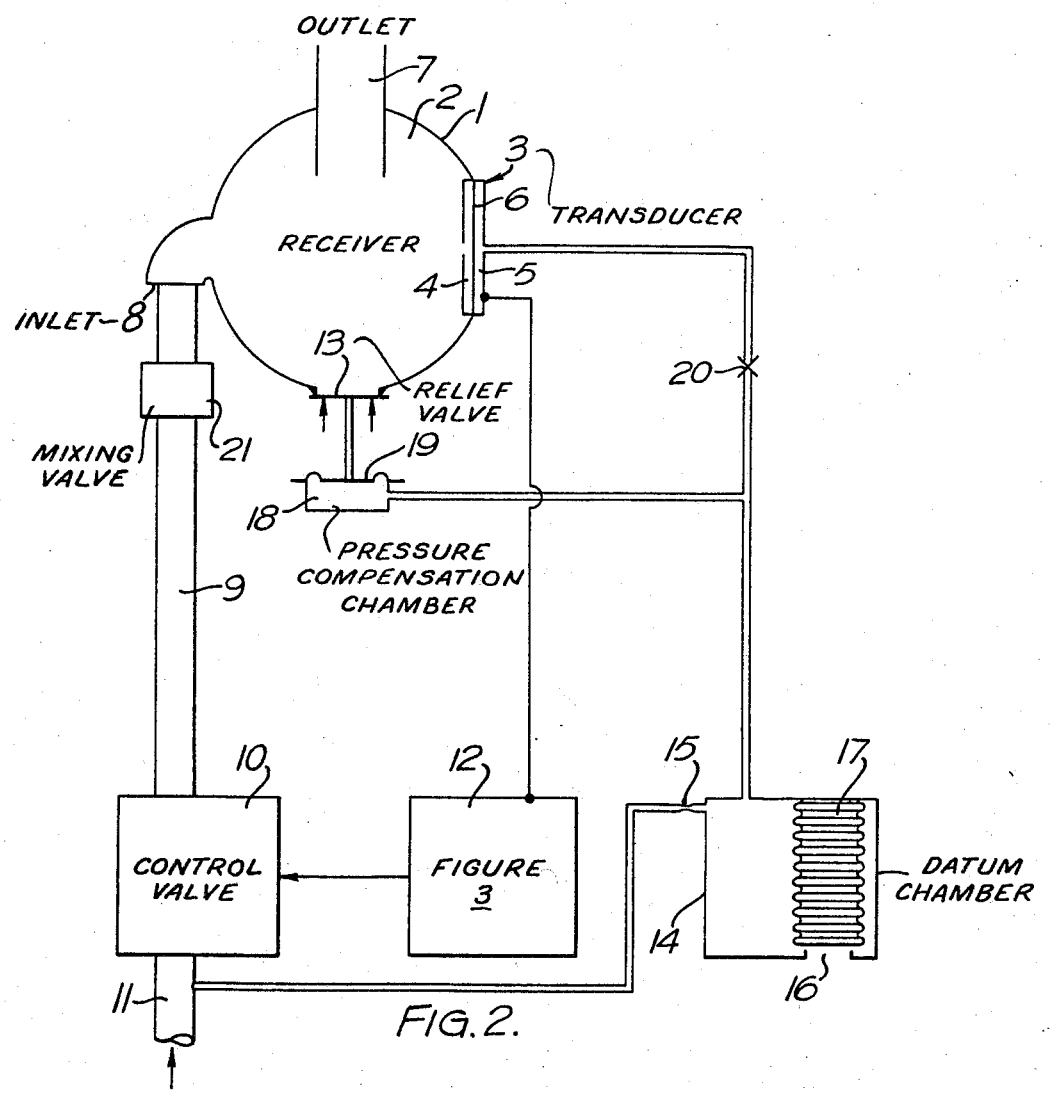
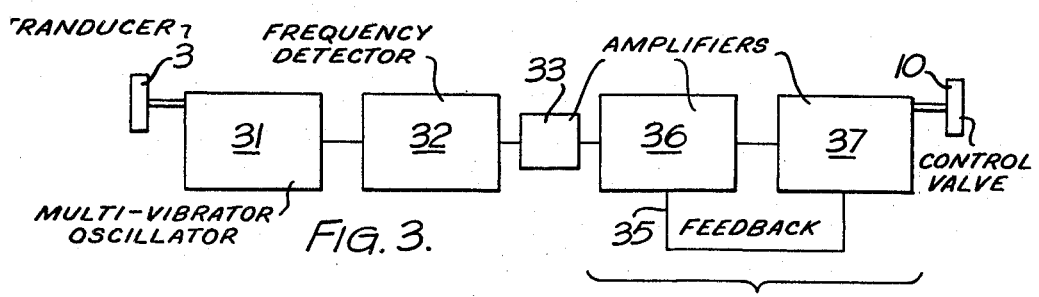

3,500,826
AUTOMATIC FLUID SUPPLY CONTROL
APPARATUS
Christopher Adrian Haire, Weybridge, England, assignor, by mesne assignments, to Westland Aircraft Limited, Yeovil, Somerset, England, a corporation of the United Kingdom
Filed July 19, 1965, Ser. No. 472,901
Claims priority, application Great Britain, Mar. 1, 1965, 8,631/65
Int. Cl. A62b 7/04
U.S. Cl. 128—142.2                                 19 Claims This invention relates to automatic apparatus for controlling the supply of fluid to a container.

Cases frequently occur where a fluid, available at a relatively high pressure, is to be supplied at a lower pressure to a device or living organism, hereinafter called the receiver. In such cases a simple system may be used, the high pressure fluid being passed through a valve into a container and thence to the receiver; the valve may be so adjusted that the pressure in the container approximates a desired mean pressure, less than the pressure at which the fluid is available. In a such a simple system, the approximation to the desired mean pressure will be sufficient for many purposes, particularly if the receiver draws fluid at a substantial uniform rate; that is, if the receiver demand is uniform. Even if the demand fluctuates, providing the fluctuations are substantially regular, such a simple system can be so proportioned that the container pressure remains sufficiently near to the desired mean value, for many purposes.

When, however, the fluctuations in demand are irregular or transient, or it is necessary to maintain the pressure in the container close to the desired mean pressure, sensitive automatic fluid flow control means become necessary.

One object of this invention is to provide apparatus which controls the supply of fluid to a container so that pressure fluctuations in the contained fluid are reduced or eliminated. Another object is to provide an electric solenoid actuator, suitable for operating a fluid control valve for said automatic apparatus; and a further object provides a fluid flow sensor suitable for providing signals for indicating when fluid is being supplied, in said apparatus, at a desired rate.

According to a first aspect of the present invention, therefore, fluid supply control apparatus comprises a fluid container having an outlet for connection to a receiver whose fluid demand may vary, and an inlet; a differential pressure transducer responsive to a pressure difference and capable of providing an electrical transducer signal, the transducer being connected with the fluid in the container; an electrically operated fluid control valve having an outlet connectable to the inlet of the container and an inlet for connection to a source of fluid under pressure; and an electronic device having an input electrically connectable with the transducer and an output for supplying a control signal to the fluid control valve; the characteristics of the electronic device and the fluid control valve being such that, in use, the amount of fluid flowing into the container is substantially proportional to the decrease of the pressure in the container, relative to a reference pressure applied to the differential pressure transducer.

The response characteristic of the electronic device may be such that, in use, proportional response occurs only when the container pressure decreases at a rate which is greater than a predetermined minimum rate. At rates substantially less than the minimum rate, there is no supply of fluid to the container.

The reference pressure may be supplied by mechanical means (for example, by a spring), which may include means for adjusting the reference pressure; on the other hand, the reference pressure may be supplied by fluid means. In either case the reference pressure may remain constant, for a time at least, at a predetermined value; or it may itself vary in any maner. It should be noted that, if the reference pressure rises, or rises sufficiently rapidly, a corresponding transducer signal reaching the amplifier will allow fluid to enter the container, to raise the pressure therein accordingly. If, on the other hand, the reference pressure falls (or if, for any reason, the pressure in the container rises above the reference pressure), then additional means will be necessary, if the container pressure is to be reduced; for example, the container may be provided with a suitably controlled relief valve.

Apparatus according to this aspect of the invention will have many obvious applications. The nature of the intion will, however, be made clear by describing, by way of example, a particular aplication to oxygen breathing apparatus for controlling the supply of oxygen to an aircrew member. The description will refer to the accompanying drawings, in which:

FIGURE 1 is a diagram illustrating the principles of an apparatus for controlling the supply of oxygen to an air-crew member;

FIGURE 2 is a diagram illustrating preferred features added to the apparatus of FIGURE 1;

FIGURE 3 is a block diagram showing the electrical apparatus of FIGURE 1 in greater detail;

FIGURES 4A and 4B show a differential pressure transducer suitable for the apparatus of FIGURE 2;

Figure 5:
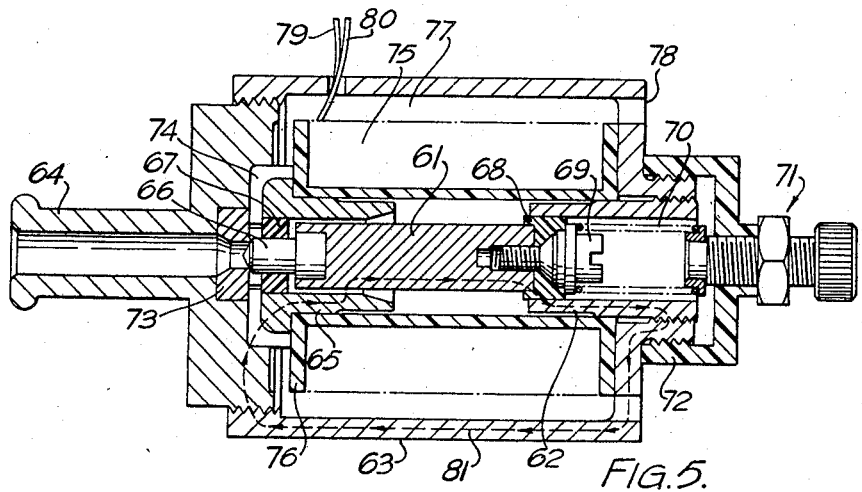
FIGURE 5 shows an axial cross-section of a solenoid actuator, arranged for operating a fluid control valve constructionally associated therewith.

In FIGURE 1, 1 is an oxygen mask which, when fixed over the mouth and nose of an air-crew member (the receiver), provides a mask cavity 2 (the container). A capacitance differential pressure transducer 3 (to be further described hereinafter) has two chambers 4 and 5, separated by a diaphragm 6; chamber 4 communicates with the mask cavity 2 via an aperture and, in FIGURE 1, chamber 5 communicates with the surrounding atmosphere via a second aperture; the reference pressure is thus the ambient atmospheric pressure. The nose and mouth of the air-crew member are represented by a passage 7 forming the outlet of the container. A container inlet 8 is connected, by a pipe 9, to an electrically operated oxygen control valve 10, itself connected to a high pressure oxygen supply at 11.

The control valve 10 should be capable of controlling the passage of oxygen to the mask cavity, in proportion to the electric control signal it receives from the electronic device. A suitable solenoid actuated fluid control valve is illustrated in FIGURE 5 and now to be described, but any other suitable electrically controlled fluid control valve may be used.

Solenoid actuators are known in which a coil of closely wound turns of wire surrounds an armature or plunger of magnetic material, the armature being free to move under the influence of the coil, when the latter is energized electrically. Such devices are of a two-state or on-off nature. Stops are provided to limit the range of travel of the armature, which is biased against one stop when no current flows in the coil; when at least a minimum operating current flows in the coil, the armature is held by magnetic force against the other stop.

A second aspect of the present invention provides an improved solenoid actuator, wherein the plunger is displaced, against a biasing force, through a distance which is continuously dependent on the magnitude of the current flowing in the coil.

According, therefore, to a second aspect of this invention, a solenoid actuator comprises a magnetic circuit including a magnetic element connected therein by two non-magnetic gaps, preferably all the materials of the magnetic circuit, other than the gaps, having permeabilities substantially greater than unity; the magnetic element being capable of movement along a path at least one end of which is determined by a stop position, and of being maintained in said stop position, except when actuated, by a biasing force; and means, responsive to electric current, for producing in the magnetic circuit a magnetic flux whose magnitude is related to said current; the two non-magnetic gap arrangements being so co-operatively proportioned and disposed that movement of the element is related, in a predetermined manner, to the current and to the biasing force.

Such a solenoid actuator may be used to cause mechanical movement, controlled in magnitude according to the actuating electric current, of many different kinds of device. A solenoid actuator arranged for operating a fluid control valve constructionally associated with the solenoid, is particularly suitable for use with apparatus according to the first aspect of this invention; an exemplary arrangement is as follows.

In FIGURE 5, 61 is a cylindrical movable magnetic element or solenoid plunger, connected in a magnetic circuit comprising an adjustable bush 62, a cup-shaped solenoid outer shell 63, a fluid inlet body 64, and a fixed bush 65; all the parts 61 to 65 are made of soft magnetic materials, having permeabilities substantially greater than unity.

The plunger 61 has a valve member 66, coaxially attached to one end of the plunger and guideably mounted in a bottom bearing 67, itself fixed coaxially in the fixed bush 65. A top bearing 68 is coaxially fixed to the other end of the plunger by means of a screw 69; the top bearing is slidably mounted within the adjustable bush 62. The valve member 66, bottom bearing 67, top bearing 68, and screw 69 are made of non-magnetic materials.

The inlet body 64 is screwed into the solenoid shell 63 and carries, inserted coaxially in its inner face, a valve seat member 73. The inner face of the inlet body is so shaped that, when screwed home, it seats against the fixed bush 65, leaving passages such as 74, through which fluid may flow from the valve seat 73 into the interior of the solenoid shell.

A compression spring 70 is housed within the adjustable bush 62, bearing against the rim of the screw 69 and against a flange provided on a spring tension adjustment device 71, attached to the solenoid shell 63 by means of a non-magnetic end cap 72. This compression spring 70 provides a biasing force, maintaining the valve 66 against the valve seat in the member 74, when the solenoid is not actuated. The valve 66 and valve seat co-operate to determine a bottom stop position of the plunger 61.

A solenoid coil 75, wound on a non-magnetic coil former 76, surrounds plunger 61 and parts of the fixed bush 65 and adjustable bush 62, which bushes have sliding fits within the coil former 76. There is, between the outer surface of the coil 75 and the inner cylindrical surface of the solenoid shell, an annular space 77 communicating with the passages 74 and, through ports such as 78 in the end of the solenoid shell, with the exterior of the solenoid fluid control valve assembly. This arrangement allows fluid to flow over the surface of the coil, when electric current flows in the coil and the valve is open, to cool the coil. This cooling allows the enclosed coil to be smaller, for a given maximum permissible power input, than would be the case without cooling. Leads 79 and 80 allow the coil to be connected to a source of electric current.

It will be seen that the magnetic flux path, indicated conventionally by the dashed line 81, lies within magnetic material, except for the gaps between the respective end portions of the plunger 61 and the fixed and adjustable bushes 65 and 62 respectively. The fixed bush embraces a substantial length of one end of the plunger; the percentage increase in the reluctance of the corresponding gap, as the plunger moves to its maximum displacement, is thus relatively small. The adjustable bush, on the other hand, embraces only a short length of the plunger, when the plunger is at its bottom stop position, as shown. The bush may, in fact, be so adjusted that it does not embrace the plunger at all, in this position. The percentage decrease in the reluctance of this gap, as the plunger moves away from its bottom stop position, will thus be relatively large; it is across this gap that a major part of the magnetic attractive force is developed.

The adjustable bush 62 is screwed into the end of the solenoid shell 63 and its position, relative to the plunger, may be varied (in conjunction with the spring 70), to adjust the relationship between the coil current and the plunger displacement. The maximum displacement of the plunger is determined by the dimensions of the gaps, although a practical maximum displacement (for a given spring adjustment) may be determined by the maximum permissible coil current.

Although not shown in the embodiment which is herein described, the shapes of the fixed and adjustable bushes (particularly the latter), and/or the plunger ends, in the neighbourhood of the gaps, may be chosen to provide a desired plunger displacement-current law.

Numerous applications of a solenoid actuator according to this invention, to purposes other than controlling the opening of a valve, will be obvious.

The magnetic circuit need not be totally enclosed, with its outer limb in the form of a cylinder. The magnetic circuit may take any known form, for example, it may be rectangular or of E and I form.

The principle of the solenoid actuator of the second aspect of this invention is not confined to a plunger having linear movement. For example, the magnetic circuit may have the form of a ring, a portion of which forms the movable magnetic element; co-operating gaps, arranged according to the principles described hereinbefore, being provided at each end. The movable element may be so mounted that it can move along the circular axis of the ring, about the centre of the ring, thereby providing rotational movement about that centre through a small angle. Other equivalent arrangements will be obvious.

A preferred capacitance pressure transducer has an electrically conductive diaphragm capable of moving in response to a differential pressure. The diaphragm preferably moves only in response to a decrease in pressure in the mask cavity, referred to the reference pressure: although an associated electronic device may be so designed that it only responds to a signal corresponding to a mask cavity pressure decrease. The diaphragm is insulated from the opposing fixed wall of the chamber 5; which wall is conductive, the diaphragm and wall forming the plates of a capacitor whose capacitance decreases, when the pressure in the chamber 4 (and therefore in the mask cavity) is less than the reference pressure in chamber 5. The capacitance changes are converted into a control signal, for proportionally operating the control valve 10, by means of an electronic device 12.

FIGURE 3 shows a block diagram of a preferred electronic device, comprising a multivibrator oscillator 31 followed by a frequency detector 32, itself coupled to an amplifier 34 whose output is connected to the control valve 10.

The capacitance transducer 3 forms one of the frequency determining capacitors of the multivibrator 31, whose other frequency-determining elements are of fixed or preset values; variations in the capacitance of the transducer thus cause the oscillation frequency of the multivibrator to vary, according to the variations of the mask cavity pressure.

The signal generated by the multivibrator 31 is fed to the detector 32, whose output is proportional to the change in the capacitance of the transducer and therefore to the mask cavity pressure, as that pressure varies below the reference pressure. The output of the detector is fed to the amplifier 34, which comprises a direct-coupled small-signal amplifier 36, coupled to a direct-coupled power amplifier 37, whose output feeds the actuating solenoid of the control value 10. A feedback path 35 provides feedback from the power amplifier to the small-signal amplifier, to ensure stability of the system and to provide proportional opening of the control valve.

An apparatus such as that illustrated in FIGURES 1 and 3, is capable of maintaining the pressure in the container 2 substantially equal to the reference pressure, against pressure drops due to the demands of the receiver; i.e., due to inhalation. As described, however, it is not capable of correcting any increases in pressure in the container, above the reference pressure. Such increases will occur when the receiver exhales and may be relieved by providing the mask cavity with a biassed relief valve 13 (the biasing force being indicated by the arrows), of known type, connected with the reference pressure source and arranged to open, when the pressure within the cavity rises above the reference pressure. The reference pressure may be the ambient atmospheric pressure, in which case the relief valve 13 allows the exhaled air to exhaust to the atmosphere. The relief valve may be arranged, in known manner, to prevent ingress of ambient air to the mask cavity, during inhalation, but allow exhaled gases to pass to the atmosphere with a minimum of restriction. The relief valve may, for example, comprise a spring biassed relief valve and a non-return valve.

The breathing system so far described may be regarded as a basic system. Such a system will allow breathing to take place, at a means pressure substantially equal to the ambient atmospheric pressure. However, because the electronic device is directly coupled throughout, it may be affected by changes in the characteristics of the component elements due, for example, to ambient temperature changes. The electronic device is therefore preferably provided with an AC coupling, which may conveniently be placed at 33, between the detector and the input of the amplifer 34. As before, the electronic device provides proportional control of the oxygen supply control valve 10, in response to a decrease of the pressure in the mask cavity relative to the reference pressure, but now only if the rate of decrease is sufficiently great. The minimum rate may be by suitably selecting the time constant of the AC coupling 33; the time constant is 15 secs., in an exemplary breathing system. It is thus possible for a permanent pressure differential to be established, between the mask cavity and reference pressure, provided the differential does not change, or changes at a rate substantially less than the minimum rate determined by the time constant.

In a breathing system in which the reference pressure is set at a value higher than the ambient atmospheric pressure, this effect provides a useful feature; for, if the mask is removed from the receiver's face, the resulting pressure differential at the transducer allows oxygen to be supplied (and escape) only for a time determined by the time constant, after which the valve will close. After the receiver has refixed the mask a few inhalations will cause the system to resume its normal breathing state.

In a breathing system such as is used in flying to high altitudes, it is desirable to provide means for automatically controlling the mask cavity mean pressure, as the ambient pressure (that is, the altitude) varies. One such arrangement comprises a datum pressure chamber for providing the reference pressure for the transducer, together with compensating pressure for a compensated relief valve.

A preferred arrangement is illustrated in FIGURE 2, in which numerals 1 to 12 identify items identified by corresponding numerals in FIGURE 1. In FIGURE 2, 14 is a datum pressure chamber connected to the high pressure oxygen supply at connection 11, through a constructed bleed orifice 15. The chamber 14 has a relief valve 16 connecting to the atmosphere, the opening of the valve being controlled by an aneroid bellows 17. The chamber 14 thus receives oxygen from the high pressure supply, the pressure within the chamber being automatically maintained at a particular pressure above atmosphere, according to the pressure response characteristic of the bellows 17. Adjustment means may be provided, for varying the response characteristic of the bellows, and thus the datum pressure within chamber 14.

The datum pressure chamber is connected to the chamber 5 of the pressure transducer 3, and to a pressure compensation chamber 18, which biases the relief valve 13.

The pressure compensation chamber 18 is provided with a slack diaphragm 19, one face of which is exposed to oxygen, at the datum pressure, within the chamber. The relief valve 13 is connected to the slack diaphragm; the valve is thus biassed and held closed, so long as the pressure within the mask cavity is less than the datum pressure.

In use, the breathing system illustrated in FIGURE 2 acts follows. When a receiver first fixes the mask to his face, the pressure in the mask cavity will be below the datum pressure (assuming that the datum pressure is set above the ambient atmospheric pressure). Since the electronic device includes an AC coupling, however, no oxygen will be admitted by the control valve 10, until there is a sufficiently rapid further decrease in the cavity pressure; which decrease occurs when the receiver inspires. Each inspiration will allow oxygen to enter the mask cavity while as soon as expiration raises the cavity pressure above the sum of the datum and ambient pressures, expired gasses will exhaust to the atmosphere through the relief valve. After only a few breathing cycles, the operating conditions become regular, the means pressure in the mask being substantially equal to the pressure in the datum chamber and maintained by the supply of oxygen to the mask cavity, at each inhalation.

Oxygen breathing apparatus, as hereinbefore described, preferably includes a fluid flow sensor. This invention therefore also provides one suitable fluid flow sensor which is capable of providing signals for transmission to a remote indicating device, according as the rate of flow of a fluid is greater or less than a predetermined desired value. The sensor is especially suitable for use when the fluid is at a high pressure and the flow rate is a small.

According to a third aspect of this invention, a fluid flow sensor comprises a fixed part; inlet and outlet connections for connecting the sensor in a fluid flow line; means for restricting the flow of fluid between the inlet and the outlet so as to produce a pressure difference therebetween; a magnetic reed switch attached to said fixed part of the sensor; means for actuating the reed switch in response to said pressure difference, said means including a magnet and a member, movable in response to the pressure difference, for carrying the magnet, the reed switch and the magnet being so relatively disposed that the switch is actuated when the pressure difference exceeds a pre-determined minimum value; and means associated with said pressure difference responsive movable member, for permitting substantially unrestricted increase of fluid flow, after the reed switch has been actuated in response to said pressure difference.

Figure 6:
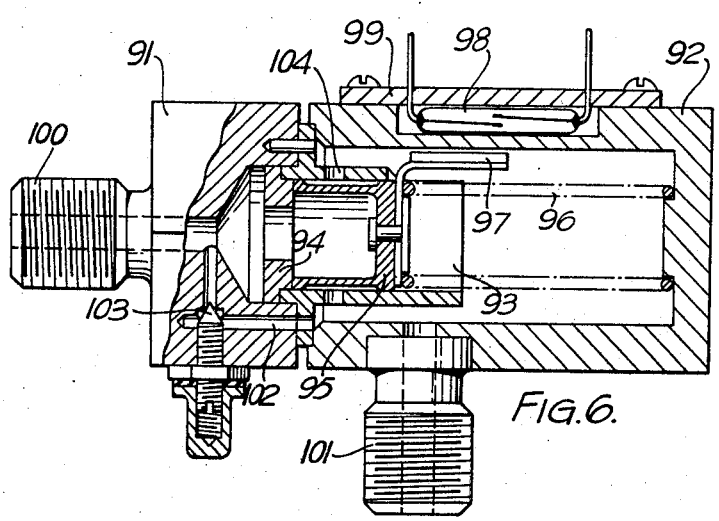
FIGURE 6 shows a fluid flow sensor.

An exemplary embodiment is shown in FIGURE 6, and comprises hollow inlet and outlet bodies, 91 and 92 respectively, secured together by two diametrically opposite screws (not shown) passing through holes in the inlet body into tapped holes in the outlet body. Within the outlet body 92 there is a cylinder 93 open thereto and communicating with the inlet body 91, through an aperture in the cylinder end-cap 94. A piston 95 is arranged to slide within the cylinder against a spring 96. The piston carries a magnet 97, capable of moving in close proximity with a magnetic reed switch 98, held in an external recess in the outlet body and covered by a cover plate 99. The outlet body, at least, is made of non-magnetic material.

The inner chamber of the inlet body 91 is connectable to a fluid supply source, via an inlet 100, and the inner chamber of the outlet body 92 is connectable, via an outlet 101, to apparatus to which the fluid is to be supplied. Fluid in the inlet body chamber can pass to the outlet body chamber (and thence to the outlet) through a passage 102, via a screw-adjustable valve 103. When the inlet pressure exceeds the outlet pressure by a sufficient amount, the piston will move towards the outlet body chamber and uncover ports, such as 104, in the cylinder wall, allowing the fluid flow rate to increase without excessive pressure drop in the device.

In use, the reed switch will operate only when the piston (carrying the magnet) has moved sufficiently far towards the outlet body chamber. The magnet and switch are so relatively positioned that this movement is less than that required to open the ports 104. This sufficient movement of the piston depends on the pressure exerted by the spring and the difference between the fluid pressures in the inlet and outlet chambers; that is, the movement depends on the rate of flow of the fluid, to an extent dependent upon the opening of the valve 103. This valve can therefore be adjusted, so that the reed switch operates when the rate of flow exceeds a desired rate (within the range of the device).

The sensor may be connected between the oxygen source and the connection 11 in FIGURE 1 or 2. A suitable electrical indicator, positioned as desired, is so connected to the sensor as to indicate when oxygen is flowing to the breathing apparatus at more than a predetermined minimum rate.

The embodiments described hereinbefore comprise closed-loop control systems, and sufficient damping must be present to allow stable operation throughout a desired range of operation. In the apparatus illustrated in FIGURE 2, three damping means are provided:

(1) The feedback between the amplifiers 37 and 36 (in FIGURE 3) may be adjusted;

(2) The diaphragm of the pressure transducer is damped, at its equilibrium position, by resting against the fixed wall of the chamber 5. The damping characteristic may be selected by selectively cutting slotted fluid passages in the face of the wall;

(3) An adjustable bleed orifice 20 is inserted in the line connecting the pressure transducer 3 to the datum pressure chamber 14.

A conventional airmix valve, 21 in FIGURE 2 can be inserted between the control valve 10 and the mask inlet 8. The airmix valve should be connected to the mask inlet by means of tube or connector having a sufficiently large bore.

A differential pressure transducer is illustrated by a sectional view, FIGURE 4A, and an exploded part-section in FIGURE 4B; amongst other applications, such a transducer is particularly suitable for oxygen breathing systems such as are illustrated in FIGURES 1 and 2 and have been described hereinbefore.

In FIGURE 4A (and FIGURE 4B, where applicable), 41 is a circular front plate and 42 is a circular rear plate. The two plates are preferably made of metal and are so shown, but may be of insulating material, the inner face of the rear plate 42 being metallised, to provide a capacitor plate. When the plates are metal, the rear plate has a ring 43, of insulating material, let into its inner face. A diaphragm 44, of insulating material such as "Melinex" (registered trademark), is clamped between the front and rear plates, by means of screws such as 45, of insulating material such as nylon. The face 46 of the diaphragm is metallised, by known means, and is in electrical contact with the front plate 41 but insulated from the rear plate. A screwed terminal 47 passes through an insulating bush 48 into a threaded hole in the front plate 41, providing means of electrical connection to the metallised face 46 of the diaphragm; a similar screwed terminal 49 is screwed into the rear plate 42, for electrical connection thereto. The metallised face 46 of the diaphragm and the inner face of the rear plate 42 comprise the capacitance element of the transducer, the insulating material of the diaphragm forming at least part of the capacitor dielectric.

The inner face of the front plate 41 is recessed to provide a chamber 40, corresponding to the chamber 4 of FIGURES 1 and 2; a passage 51 connects this chamber with the mask cavity, when the transducer is assembled therein. The rear plate 42 is provided with a connection 52, for connection with a fluid source of reference pressure, such as the datum pressure chamber of FIGURE 2. The inner face of the rear plate has fluid passages cut in it, indicated in FIGURE 4B as the grooves, 50, of a spiral; the passages may, however, have any desired form, communicating with the connection 52. The connection 52 and the passages 50 correspond to the chamber 5 of FIGURES 1 and 2.

So long as the pressure in the chamber 40 is greater than that in the passages 50, the diaphragm remains in contact with the rear plate 42, and the capacitance of the transducer remains substantially constant. However, when the pressure in the chamber is less than that in the passages, the diaphragm will flex away from the rear plate and the capacitance will decrease; for small pressure differences, at least, the capacitance change will be substantially proportional to the pressure difference. The insulating ring 43, let into the inner face of the rear plate adjacent the mating face of the front plate, makes relatively small that part of the transducer capacitance which does not vary with pressure.

It is important that the diaphragm be assembled in the transducer so that it is under uniform tension; a satisfactory way of ensuring this is as follows. The diaphragm material is initially cut out as a square with its corners removed, leaving four projecting edges; clearance holes for the screws 45 and the terminals 47 and 49 are punched about the centre of the square. The material is then supported in a horizontal plane, with the front plate 41 correctly positioned underneath and in contact with the material. A desired tension is applied to the material along two perpendicular axes in the plane of the material; for example, by connecting cords to the four projecting edges, passing each cord over a pulley and loading it with a suitable weight; the material may then be clamped in place, if desired. The rear plate 42 is then placed in position and the screws 45 and terminals 47 and 49 inserted and screwed tight, after which the projecting excess diaphragm material is removed.

A differential fluid pressure transducer such as has just been described may be used for many purposes, being modified as desired. Thus, the passage 51 may be replaced by a connection similar to 52, or one or both plates may be provided with one or more transverse passages, communicating with the outer faces. The rear plate 42 may be recessed in a manner similar to the front plate 41, allowing the diaphragm to move into the chamber 50; the transducer will then be capable of responding to increases of pressure in the chamber 40, relative to that in the chamber 50.

What is claimed is:

1. Oxygen breathing apparatus for supplying oxygen to a person breathing, comprising a face mask having the gas inlet; means for connecting the mask with the face of the person, so that the mask and the face will co-operate to form a mask cavity with which the nose and mouth of the person communicate; a capacitance differential gas-pressure transducer having first and second chambers and a diaphragm providing a capacitor dielectric that separates the chambers; the wall of the second chamber providing one electrode and the face of the diaphragm exposed within the first chamber providing the other electrode, whereby relative movement of the electrodes varies the capacitance generating a variable electric output signal; a pressure datum chamber for providing gas at an adjustable predetermined pressure; means for mounting the transducer in the mask and for permitting gas in the mask cavity to communicate with the first chamber of the transducer, and means for conveying gas between the pressure datum chamber and the second chamber of the transducer, so that the capacitance of the transducer will be related to a difference between the pressures in the mask cavity and in the datum chamber, so long as the pressure in the datum chamber is at least as great as the pressure in the mask cavity; an electrically actuable oxygen flow control valve having an oxygen inlet, an oxygen outlet and electronic control device for supplying an electric control signal to actuate the valve so that oxygen may pass from the inlet to the outlet, according to the magnitude of the control signal; means for connecting the control valve outlet to the gas inlet of the face mask; means for connecting the control valve inlet to a source of oxygen at a pressure greater than the desired maximum pressure in the mask cavity; the electronic control device having input and output connections and adapted to provide an electric control signal according to the capacitance at the input connection; means for electrically connecting the input and output connections of said device to the electrodes of the capacitance transducer and to the oxygen flow control valve, respectively, so that oxygen may be admitted to the mask cavity according to the demand of the person breathing and inhaling; damping means associated with the means for conveying gas between the datum pressure chamber and the second chamber of the transducer to allow stable operation of the apparatus throughout a desired range of operation; a biased relief valve, having a gas inlet and a gas outlet, and means, connected to the datum pressure chamber, for biasing the valve to a closed position; means connecting the inlet and the outlet of the relief valve to the mask cavity and to atmosphere, respectively, so that the relief valve will remain open so long as the pressure within the mask cavity exceeds that in the datum chamber, thereby allowing gas to exhaust from the mask cavity to the ambient atmosphere, when the pressure in the datum pressure chamber exceeds the ambient atmospheric pressure, and thereby releasing gas exhaled by the person breathing.

2. Oxygen breathing apparatus as claimed in claim 1 wherein said electrically actuable oxygen flow control valve comprises a solenoid actuator comprising a magnetic circuit including a magnetic element disposed between two nonmagnetic gaps, preferably all the materials of the magnetic circuit, other than the gaps, having permeabilities substantially greater than unity, the magnetic element being so mounted in relation to the remainder of the magnetic circuit as to be capable of movement along a path at least one end of which is determined by a stop position; means responsive to electric current, for producing in the magnetic circuit a magnetic flux whose magnitude is related to said current; and biasing force means for maintaining the magnetic element in the stop position when the electric current is substantially zero; the two non-magnetic gaps being so co-operatively proportioned and disposed that movement of the magnetic element is related in a predetermined manner to the current and to the biasing force; and valve means, connected to and actuable by the magnetic element, and disposed between said oxygen inlet and outlet.

3. Oxygen breathing apparatus as claimed in claim 1 wherein said electrically actuable oxygen flow control valve comprises a magnetic circuit comprising an adjustable bush, a cup-shaped outer solenoid shell, an oxygen gas inlet body, a fixed bush; a top and a bottom bearing, a nonmagnetic coil former; a magnetic circuit including a movable plunger disposed between two nonmagnetic gaps, preferably all the materials of the magnetic circuit, other than the gaps, having permeabilities substantially greater than unity; a valve member coaxially attached to one end of the plunger and guidably mounted in said bottom bearing fixed coaxially in the fixed bush and said top bearing being coaxially fixed to the other end of the plunger and slidably mounted within the adjustable bush; said valve member, bottom bearing, and top bearing being made of non-magnetic materials; the inlet body being connected to the solenoid shell and having inserted coaxlially in its inner face a valve seat member, the inner face of the inlet body being seated against the fixed bush leaving passages through which oxygen can flow from the valve seat into the interior of the solenoid shell; spring means providing a biasing force tending to maintain the valve member against the valve seat, the valve member and valve seal co-operating to determine a bottom stop position of the plunger; a solenoid coil, wound on said non-magnetic coil former surrounding the plunger and parts of the fixed and adjustable bushes, the outer surface of the coil and the inner cylindrical surfaces of the outer solenoid shell co-operating to provide a space communicating with the passages, ports being provided in the shell forming the control valve outlet, the ports and passages being so co-operatively disposed that oxygen flows over the outer surface of the solenoid coil when current flows in the coil and the valve is open; the fixed bush embracing a substantial length of one end of the plunger, while the adjustable bush embraces at most only a short length of the plunger, when the plunger is at its bottom stop position, the two non-magnetic gaps being so co-operatively proportioned and disposed that the movement of the plunger is related in a predetermined manner to the current in the solenoid coil and to the biasing force of the spring means.

4. Oxygen breathing apparatus as claimed in claim 1 wherein the electronic device comprises a multivibrator, the input connections being so connected to the multivibrator that, when connected to said input, the capacitance transducer forms one frequency determining capacitor of the multi-vibrator, whose other frequency determining elements are of fixed values, whereby variations in the capacitance of the transducer cause the oscillation frequency of said multi-vibrator to vary according to variations in the mask cavity pressure; a detector having an input connected to the muti-vibrator to receive signals generated thereby, and an output connection, the signal appearing at the output connection being proportional to the change in the capacitance of the transducer; an amplifier having an input and an output and comprising a direct-coupled small-signal amplifier connected to the input and a direct-coupled power amplifier connected to receive a signal from the small-signal amplifier and to pass an output to the output connection of the electronic device; a feedback path between the power amplifier and the small-signal amplifier, to provide a feedback signal for ensuring stable operation of the system and for providing proportional opening of the control valve; an alternating current coupling disposed between the output of the detector and the input of the amplifier, the time constant of the alternating current coupling being selected so that the apparatus provides proportional control of the valve in response to a decrease of pressure in the mask cavity relative to the pressure in the datum chamber, only if the rate of decreaes exceeds a selected value, whereby a permanent pressure differential may be established between the mask cavity and the datum chamber provided the rate of change of the pressure differential is substantially less than a rate determined by the time constant.

5. Oxygen breathing apparatus as claimed in claim 1 comprising an oxygen flow sensor inserted between the oxygen source and the oxygen input of the oxygen gas flow control valve; said sensor comprising inlet and outlet means for connecting the sensor in the oxygen flow line; means for restricting the flow of oxygen between the inlet and the outlet means so as to produce a pressure difference therebetween; electrical switch means connected to said electric control signal supplying means comprising a magnetic reed switch; and means responsive to said pressure difference for actuating the electrical switch means, which responsive means comprises a cylinder, a spring biased piston movable within the cylinder, means permitting one side of the piston to communicate with the inlet means and the other side of the piston to communicate with the outlet means; and magnetic means connected to and movable by the piston for actuating the reed switch; and means permitting substantially unrestricted flow of oxygen through the sensor, after actuation of the reed switch.

6. Oxygen breathing apparatus as claimed in claim 1, wherein said capacitance differential gas-pressure transducer comprises a front member, a rear member and a flexible diaphragm clamped therebetween under substantially uniform predetermined tension, at least the central inner face of the front member and the adjacent first surface of the diaphragm comprising electrically conductive material, said faces being directly electrically connected together, and at least the central inner portion of the inner face of the rear member comprising electrically conductive material, electrically insulated from the diaphragm, whereby there is a measurable capacitance between the rear member and the diaphragm, said capacitance depending upon the relative positions of the diaphragm and the conductive inner face of the rear member; the central inner face of the front member being spaced from the adjacent first surface of the diaphragm to provide said first fluid chamber, the inner face of the rear member being shaped and disposed, relative to the diaphragm, to provide said second fluid chamber, said shape and disposition being so selected that said capacitance bears a predetermined relationship to fluid pressures in the first and second fluid chambers acting in combination: the transducer further comprising fluid connectors for connection with the mask cavity and the pressure datum chamber, associated respectively with the front and rear members, and means connecting said connectors to the first and second fluid chambers, respectively; and first and second terminals, respectively connected to the conducting inner faces of the front and rear members, said terminals being connected to respective input connections of said electronic device.

7. An electrically operated fluid flow control valve comprising a magnetic circuit comprising an adjustable bush, a cup-shaped outer solenoid shell, and a fluid inlet body, assembled so as to contain in operative arrangement a fixed bush, a coil former, a magnetic circuit including a movable plunger disposed between two non-magnetic gaps, preferably all of the materials of the magnetic circuit, other than the gaps, having permeabilities substantially greater than unity; a bottom bearing, fixed in the fixed bush and a top bearing coaxially fixed to one end of the plunger and slidably mounted within the adjustable bush; a valve member coaxially attached to the other end of the plunger and guidably mounted in the bottom bearing, the valve member, bottom bearing and top bearing being made of non-magnetic materials; a valve seat member inserted coaxially in the inner face of the inlet body, the inlet body being secured to the solenoid shell and having its inner face so shaped that the inner face seats against the fixed bush leaving passages through which fluid can flow from the valve seat into the interior of the solenoid shell; spring means providing a biasing force tending to maintain the valve member against the valve seat, the valve member and valve seat co-operating to determine a bottom stop position of the plunger; a solenoid coil, wound on a non-magnetic coil former surrounding the plunger and parts of the fixed and adjustable bushes, the outer surface of the coil and the inner cylindrical surface of the outer solenoid shell co-operating to provide a space communicating with said passages, ports being provided in the shell forming the control valve outlet, the ports and passages being so cooperatively disposed that fluid flows over the outer surface of the solenoid coil when current flows in the coil and the valve is open; the fixed bush embracing a substantial length of one end of the plunger while the adjustable bush embraces at most only a short length of the plunger, when the plunger is at its bottom stop position, the two non-magnetic gaps being so co-operatively proportioned and disposed that the movement of the plunger is related in a predetermined manner to the current in the solenoid coil and to the biasing force of the spring means.

8. An electrically operated fluid flow control valve as claimed in claim 7, wherein the adjustable bush and the corresponding end of the plunger are so co-operatively shaped, in the neighbourhood of the gap, as to provide a desired plunger displacement-current law.

9. An electrically operated fluid flow control valve as claimed in claim 8, wherein the fixed bush and the corresponding end of the plunger are so co-operatively shaped in the neighbourhood of the corresponding gap that, in co-operation with the adjustable bush and corresponding plunger end, a desired plunger displacement-current law is provided.

10. A fluid flow sensor comprising hollow inlet and outlet bodies secured together and provided respectively with inlet and outlet chambers, and with inlet and outlet connections for connecting the sensor in a fluid flow line; a cylinder within the sensor, open at the ends to the inlet and outlet chambers and having at least one port in its wall, communicating with the outlet chamber; a piston slidable within the cylinder and a spring for urging the piston towards the inlet chamber; a passage for conducting fluid from the inlet chamber to the outlet chamber and means for restricting the flow of fluid through the passage so as to produce a fluid pressure difference between the inlet and outlet chambers; a magnet fixed to and movable by the piston and a magnetic reed switch, magnetically connected to said magnet and actuable by the magnet when the piston has moved away from the inlet chamber end of the cylinder under the influence of a predetermined fluid pressure difference between the inlet and outlet chambers, said ports in the cylinder wall being opened to the inlet chamber, after the reed switch has been actuated.

11. A capacitance differential pressure transducer comprising a front member, a rear member and a flexible diaphragm clamped therebetween under substantially uniform predetermined tension, at least the central inner face of the front member and the adjacent first surface of the diaphragm comprising electrically conductive material, said faces being directly electrically connected together, and at least the central inner portion of the inner face of the rear member comprising electrically conductive material, electrically insulated from the diaphragm, whereby there is a measurable capacitance between the rear member and the diaphragm, said capacitance depending upon the relative positions of the diaphragm and the conductive inner face of the rear member; the central inner face of the front member being spaced from the adjacent first surface of the diaphragm to provide a first fluid chamber, the inner face of the rear member being shaped and disposed, relative to the diaphragm, to provide a second fluid chamber, said shape and disposition being so selected that said capacitance bears a predetermined relationship to fluid pressures in the first and second fluid chambers acting in combination: the transducer further comprising fluid connectors, associated respectively with the front and rear members, and means connecting said connectors to the first and second fluid chambers, respectively; and first and second terminals, respectively connected to the conducting inner faces of the front and rear members.

12. A transducer as claimed in claim 11, wherein said front member is a circular metal member having a recessed inner face surrounded by a raised marginal portion; said rear member is a circular metal member having an insulating ring around an outer marginal portion; and wherein said flexible diaphragm comprises insulating material, said first surface comprising electrically conductive material.

13. A transducer as claimed in claim 12 wherein the central portion of said inner face of said rear member is plane, and said insulating ring projects above said plane portion of the inner face, thereby forming a recess and spacing the diaphragm from said face.

14. A transducer as claimed in claim 12 wherein the central portion of said inner face of said rear member comprises a recessed plane surface, said insulating ring being let into the marginal portion so as to lie flush with the plane surface; the ratio of recessed areas to the plane surface being selected to provide a predetermined relationship between capacitance changes corresponding to pressure differentials between the first and second chambers exceeding unity, and capacitance changes corresponding to pressure differentials less than unity.

15. Oxygen breathing apparatus as claimed in claim 3 wherein the capacitance differential gas-pressure transducer comprises a front member, a rear member and a flexible diaphragm clamped therebetween under substantially uniform predetermined tension, at least the central inner face of the front member and the adjacent first surface of the diaphragm comprising electrically conductive material, said faces being directly electrically connected together, and at least the central inner portion of the inner face of the rear member comprising electrically conductive material, electrically insulated from the diaphragm, whereby there is a measurable capacitance between the rear member and the diaphragm, said capacitance depending upon the relative positions of the diaphragm and the conductive inner face of the rear member; the central inner face of the front member being spaced from the adjacent first surface of the diaphragm to provide said first fluid chamber, the inner face of the rear member being shaped and disposed, relative to the diaphragm, to provide said second fluid chamber, said shape and disposition being so selected that said capacitance bears a predetermined relationship to fluid pressures in the first and second fluid chambers acting in combination; and transducer further comprising fluid connectors for connection with the mask cavity and the pressure datum chamber, associated respectively with the front and rear members, and means connecting said connectors to the first and second fluid chambers, respectively; and first and second terminals, respectively connected to the conducting inner faces of the front and rear members, said terminals being connected to respective input connections of said electronic device; and wherein there is provided an oxygen flow sensor inserted between the oxygen source and the oxygen input of the oxygen gas flow control valve; said sensor comprising inlet and outlet means for connecting the sensor in the oxygen flow line; means for restricting the flow of oxygen between the inlet and the outlet means, so as to produce a pressure difference therebetween; electrical switch means connected to said electric control signal supplying means comprising a magnetic reed switch; and means responsive to said pressure difference for actuating the electrical switch means, which responsive means comprises a cylinder, a piston movable within the cylinder, means permitting one side of the piston to communicate with the inlet means and the other side of the piston to communicate with the outlet means; and magnetic means connected to and movable by the piston for actuating the reed switch when the piston has moved away from the inlet means under the influence of a predetermined fluid pressure difference between the inlet and outlet means; the cylinder having at least one port in its wall, communicating with the outlet means and capable of being opened to the inlet means, after the reed switch has been actuated; there being provided a spring for urging the piston towards the inlet means.

16. Oxygen breathing apparatus as claimed in claim 15 wherein the electronic device comprises a multivibrator, the input connections being so connected to the multi-vibrator that, when connected to said input, the capacitance transducer forms one frequency determining capacitor of the multi-vibrator, whose other frequency determining elements are of fixed values, whereby variations in the capacitance of the transducer cause the oscillation frequency of said multi-vibrator to vary according to variations in the mask cavity pressure; a detector having an input connected to the multivibrator to receive signals generated thereby, and an output connection, the signal appearing at the output connection being proportional to the change in the capacitance of the transducer; an amplifier having an input and an output and comprising a direct-coupled small-signal amplifier connected to the input and a direct-coupled power amplifier connected to receive a signal from the small-signal amplifier and to pass an output to the output connection of the electronic device; a feedback path between the power amplifier and the small-signal amplifier, to provide a feedback signal for ensuring stable operation of the system and for providing proportional opening of the control valve; an alternating current coupling disposed between the output of the detector and the input of the amplifier, the time constant of the alternating current coupling being selected so that the apparatus provides proportional control of the valve in response to a decrease of pressure in the mask cavity relative to the pressure in the datum chamber, only if the rate of decrease exceeds a selected value, whereby a permanent pressure differential may be established between the mask cavity and the datum chamber provided the rate of change of the pressure differential is substantially less than a rate determined by the time constant.

17. Oxygen breathing apparatus for supplying oxygen to a person breathing comprising a face mask having a cavity with which the nose and mouth of the person communicate, a gas inlet and two gas outlets, relief valve means, a differential pressure transducer responsive to a pressure difference, means defining a source of reference pressure, first means coupling said transducer to said cavity, second means coupling said transducer to said reference pressure source, said transducer including means for providing an electrical signal in response to a pressure differential between said cavity and said reference pressure source, a gas source coupled to said gas inlet, means for regulating the flow of gas from said source to said gas inlet in response to the electrical signal produced by said transducer, said relief valve means normally closing one of said two gas outlets of said mask, and means coupling said source of reference pressure to said relief valve means for urging the latter to its closed position so long as the reference pressure is greater than the pressure in the mask cavity but permitting gas to exhaust from the mask cavity to atmosphere where the pressure within the mask cavity exceeds the reference pressure.

18. The oxygen breathing apparatus as defined in claim 17 wherein said transducer includes first and second chambers separated by a diaphragm, and said first and second coupling means are in fluid communication with the respective first and second transducer chambers.

19. The oxygen breathing apparatus as defined in claim 17 including means for adjusting the reference pressure.

(References on following page)

References Cited

UNITED STATES PATENTS

| | | | |
|---|---|---|---|
| 2,418,034 | 3/1947 | Kizaur | 128—142.2 X |
| 2,791,657 | 5/1957 | Bloxsom et al. | 200—81.9 |
| 2,867,757 | 1/1959 | Wagner | 73—205 X |
| 2,907,320 | 10/1959 | DeWeese et al. | 128—2 |
| 2,963,563 | 12/1960 | Patterson | 200—81.9 |
| 3,001,757 | 9/1961 | Ball | 251—140 |
| 3,241,006 | 3/1966 | Boyko | 339—273 |

WILLIAM E. KAMM, Primary Examiner

U.S. Cl. X.R.

251—141; 73—199, 205; 137—81